(12) United States Patent
Shih et al.

(10) Patent No.: US 7,913,118 B2
(45) Date of Patent: Mar. 22, 2011

(54) IN-CIRCUIT DEBUGGING SYSTEM AND RELATED METHOD

(75) Inventors: Yuan-Yuan Shih, Pingtung County (TW); Chi-Chang Lai, Taichung County (TW)

(73) Assignee: Andes Technology Corporation, Science-Based Industrial Park, Hsin-Chu (TW)

( * ) Notice: Subject to any disclaimer, the term of this patent is extended or adjusted under 35 U.S.C. 154(b) by 405 days.

(21) Appl. No.: 12/252,338

(22) Filed: Oct. 15, 2008

(65) Prior Publication Data
US 2010/0095154 A1 Apr. 15, 2010

(51) Int. Cl.
*G06F 11/00* (2006.01)
(52) U.S. Cl. .......................................... 714/28; 717/134
(58) Field of Classification Search .................. None
See application file for complete search history.

(56) References Cited

U.S. PATENT DOCUMENTS

| 5,640,542 | A | | 6/1997 | Whitsel et al. | |
|---|---|---|---|---|---|
| 6,075,941 | A | * | 6/2000 | Itoh et al. | 717/128 |
| 6,311,292 | B1 | * | 10/2001 | Choquette et al. | 714/30 |
| 7,065,675 | B1 | * | 6/2006 | Thekkath et al. | 714/30 |
| 7,840,845 | B2 | * | 11/2010 | Doddapaneni et al. | 714/35 |
| 2003/0074650 | A1 | * | 4/2003 | Akgul et al. | 717/129 |
| 2003/0088738 | A1 | * | 5/2003 | Fox et al. | 711/129 |

* cited by examiner

*Primary Examiner* — Gabriel L Chu
(74) *Attorney, Agent, or Firm* — Winston Hsu; Scott Margo

(57) ABSTRACT

An in-circuit debugging (ICD) system includes at least a first target processor, an embedded debug mode with a debug information memory (DIM), a debug host, and an ICD bridge. The first target processor has an embedded debug module (EDM) and performs a program code in normal mode, where the first EDM controls the first target processor in debug mode. The DIM stores debug information for debugging in debug mode, and is invisible to the first target processor when the first target processor operates in normal mode. The debug host has debug software, and is utilized for debugging the program code by using the debug information in debug mode. The ICD bridge has a host debug module (HDM) coupled to the first EDM, and is coupled between the first target processor and the debug host and utilized for bridging information communicated between the first target processor and the debug host.

24 Claims, 10 Drawing Sheets

IN-CIRCUIT DEBUGGING SYSTEM AND RELATED METHOD

BACKGROUND OF THE INVENTION

1. Field of the Invention

The present invention relates to a debugging scheme, and more particularly, to an In-Circuit Debugging system and related method for debugging a program code running on a target system.

2. Description of the Prior Art

In-Circuit Debugging schemes are used for developing and debugging program codes running on target systems on chips. Please refer to FIG. 1. FIG. 1 is a diagram of a conventional In-Circuit Debugging (ICD) system 10. The ICD system 10 includes a target system 15 having a target central processing unit (CPU) 20, a debug host 25 having debug software, and an ICD bridge 30. An embedded debug module (EDM) 35 is integrated within the target CPU 20 and utilized for controlling and observing the target CPU 20 for debugging purposes. A host debug module (HDM) 40 integrated within the ICD bridge 30 provides accessibility to the EDM 35 for the debug host 25. The ICD bridge 30 is used for transferring information between the target system 15 and the debug host 25 in debug mode. In addition, the EDM 35 communicates with the HDM 40 via a communication channel such as JTAG interface. A programmer uses the debug software on the debug host 25 to debug a program code running on the target system 15 through the ICD bridge 30, the HDM 40, and the EDM 35, wherein the HDM 40 and EDM 35 communicate with each other via a joint Test Action Group interface (JTAG interface); the JTAG interface is well known to one skilled in the art and is not detailed here for brevity.

A description pertaining to In-Circuit Emulators used for debugging program codes running on a processor of a target system is disclosed in U.S. Pat. No. 5,640,542. According to the abstract of this patent, a pair of In-Circuit-Emulator modules are embedded within a microprocessor to implement parts of an In-Circuit-Emulator system. For the first In-Circuit-Emulator module, the In-Circuit-Emulator memory mapping module maps specified physical addresses into a debug memory. The physical addresses mapped into the debug memory are set by programmable registers. For the second In-Circuit-Emulator module, the In-Circuit-Emulator breakpoint module allows the user to set conditions that cause the processor to recognize specific bus events. The In-Circuit-Emulator breakpoint module monitors an internal bus and an internal bus controller. The user can set specific bus event conditions by writing to a set of breakpoint registers in the breakpoint module. Further description is not detailed here.

SUMMARY OF THE INVENTION

One of the objectives of the present invention is to a novel In-Circuit Debugging system and related method for debugging a program code running on a target processor, by storing debug information (commands, debug instructions, or data) into a debug information memory (DIM) in debug mode; the DIM is invisible to the target processor when the target processor operates in normal mode. Combining the implementation of DIM and breakpoint logic that generate events to enter debug mode, an EDM provides complete controllability and observability to a target system through the view of the target processor.

According to an embodiment of the present invention, an in-circuit debugging (ICD) system is disclosed. The ICD system comprises at least a first target processor, an embed debug module (EDM) with debug information memory (DIM), a debug host, and an ICD bridge. The first target processor has an embedded debug module (EDM) and performs a program code in normal mode, where the first EDM controls the first target processor in debug mode. The DIM stores debug information for debugging in debug mode, and is invisible to the first target processor when the first target processor operates in normal mode. The debug host has a debug software, and is utilized for debugging the program code by using the debug information in debug mode. The ICD bridge has a host debug module (HDM) coupled to the first EDM, and is coupled between the first target processor and the debug host and utilized for bridging information communicated between the first target processor and the debug host.

According to another embodiment of the present invention, an in-circuit debugging (ICD) method is disclosed. The ICD method comprises the following steps of: providing at least a first target processor having an embedded debug module (EDM), where the first target processor performs a program code in normal mode, and using the first EDM to control the first target processor in debug mode; providing a debug information memory (DIM) to store debug information for debugging in debug mode, wherein the DIM is invisible to the first target processor when the first target processor operates in normal mode; utilizing a debug software of a debug host to debug the program code by using the debug information in debug mode; and bridging information communicated between the first target processor and the debug host.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
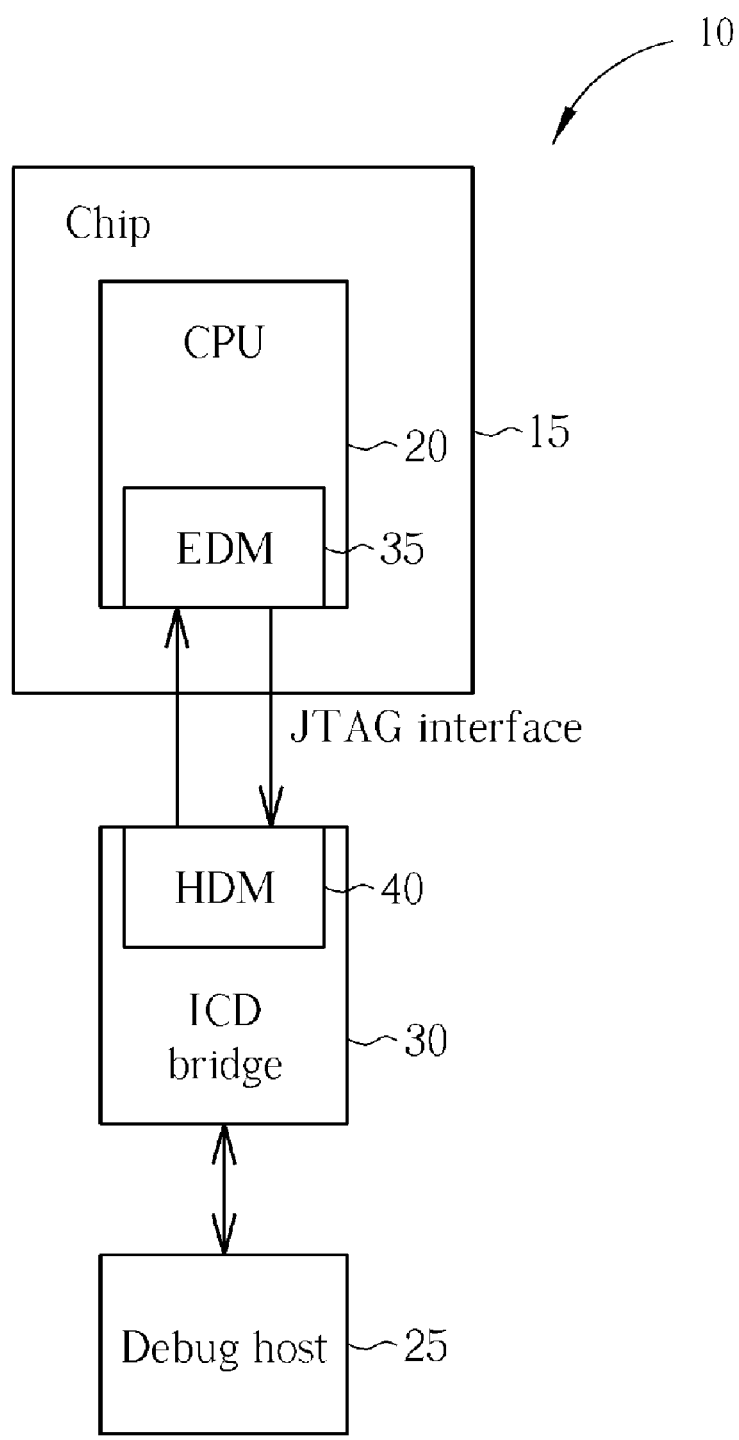
FIG. 1 is a diagram of a conventional In-Circuit Debugging system.
Figure 2A:
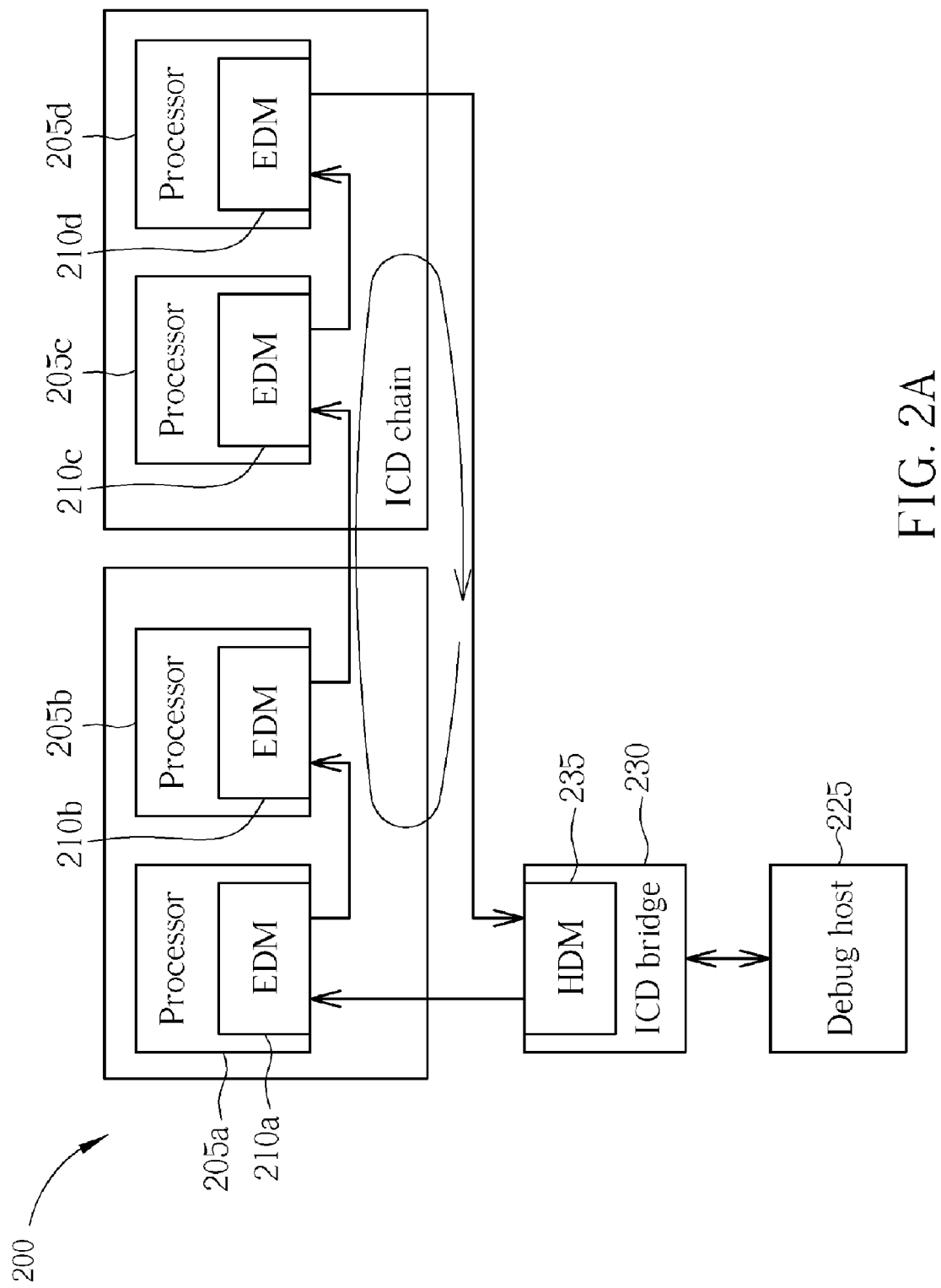
FIG. 2A is a diagram of an In-Circuit Debugging system according to an embodiment of the present invention.
Figure 2B:
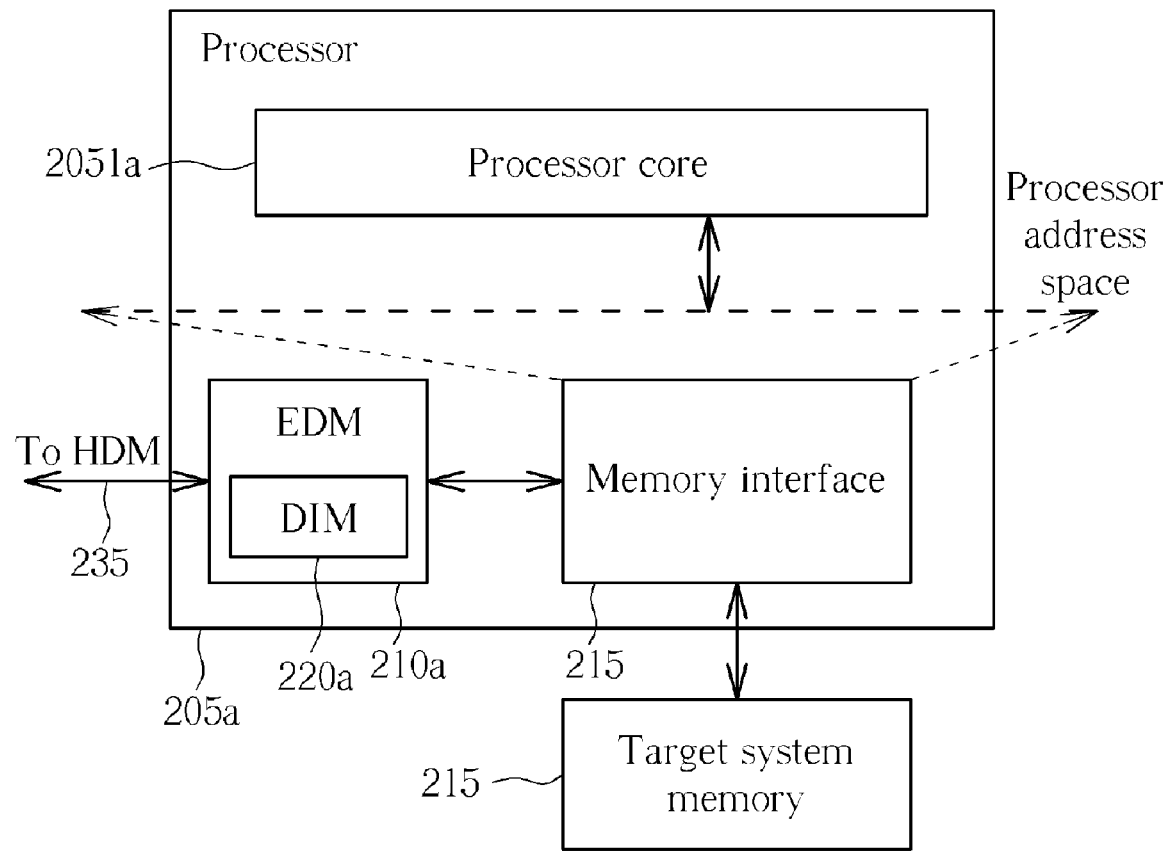
FIG. 2B is a diagram illustrating the address mapping of the processor address space of a target processor shown in FIG. 2A operating in normal mode.
Figure 2C:
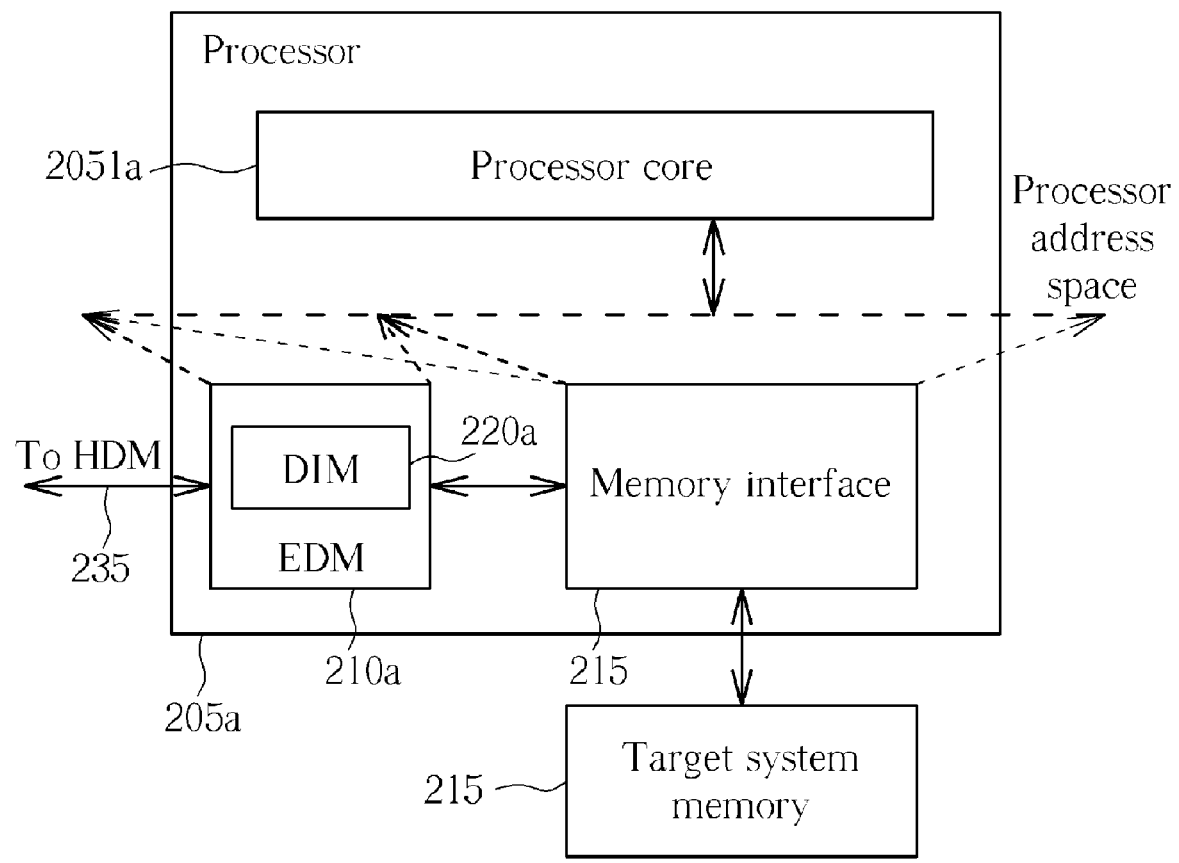
FIG. 2C is a diagram illustrating the address mapping of the processor address space of a target processor shown in FIG. 2A operating in debug mode.

Please refer to FIG. 2A. FIG. 2A is a diagram of an ICD system 200 according to an embodiment of the present invention. The ICD system 200 includes a plurality of target processors, such as central processing units (CPU) 205a, 205b, 205c, and 205d having a plurality of embedded debug modules (EDM) 210a, 210b, 210c, and 210d, a debug host 225 having debug software, and an in-circuit debugging bridge (ICD bridge) 230. The target processors 205a, 205b, 205c, and 205d perform different code segments of a program code at the same time in a normal mode. For instance, the program code can be a multi-threaded program. The EDMs 210a, 210b, 210c, and 210d respectively control the target processors 205a, 205b, 205c, and 205d for debugging purposes in debug mode. Please refer to FIG. 2B in conjunction with FIG. 2C. FIG. 2B is a diagram illustrating the address mapping of the processor address space of a target processor such as 205a operating in normal mode. FIG. 2C is a diagram illustrating the address mapping of the processor address space of a target processor such as 205a operating in debug mode. The target processor 205a is coupled to a target system memory 215, and comprises a processor core 2051a, a memory interface 2052a, and the EDM 210a including a debug information memory (DIM) 220a. As in FIG. 2B and FIG. 2C, the target system memory 215 is affixed to the target processor 205a and used for storing the program code in the normal mode, wherein a portion of the processor address space in the debug mode is allocated to the DIM 220a, and the portion is remapped back to the target system memory 215 when the debug mode exits. The DIM 220a is utilized for storing available debug information for debugging in debug mode, wherein the debug information can be commands, debug instructions, or data. The DIM 220a is invisible to the target processor 205a when the target processor 205a operates in normal mode. It should be noted that the target processors 205b-205d respectively comprise processor cores 2051b-2051d, DIMs 220b-220d, and memory interfaces 2052b-2052d coupled to the target system memory 215; for brevity, the processor cores 2051b-2051d, DIMs 220b-220d, and memory interfaces 2052b-2052d are not shown. The debug host 225 having a debug software can be utilized by a programmer to debug the program code with the debug information stored in the DIM 220a when the ICD system 200 is in debug mode. Usually, the debug mode is triggered by a debug exception when the ICD feature is enabled, and the debug information for debugging purposes is loaded into the DIM 220a after the portion of the processor address space shown in FIG. 2C is allocated to the DIM 220a. The DIM 220a is released to become free memory space again after the target processor exits debug mode. That is, the DIM 220a can be regarded as a pop-up memory space in debug mode. The operations of the target processors 205b-205d are similar to that of the target processor 205a, and are not detailed for simplicity.

The In-Circuit Debugging bridge (ICD bridge) 230 has a host debug module (HDM) 235 coupled to the EDMs 210a, 210b, 210c, and 210d, and the ICD bridge 230 is also coupled between the target processors 205a, 205b, 205c, and 205d and the debug host 225. The ICD bridge 230 is utilized for bridging information communicated between the target processors 205a, 205b, 205c, and 205d and the debug host 225. Additionally, the EDMs 210a, 210b, 210c, and 210d form an ICD chain, and the ICD chain is utilized for providing accessibility for the debug host 225 to access each of the EDMs 210a, 210b, 210c, and 210d individually. It should be noted that in this embodiment the target processors 210a and 210b are integrated within the same chip and the target processors 210c and 210d are integrated within another chip; the target processors 210a, 210b, 210c, and 210d, however, can be changed to respectively set up on four chips individually. This also obeys the spirit of the present invention.

Figure 3:
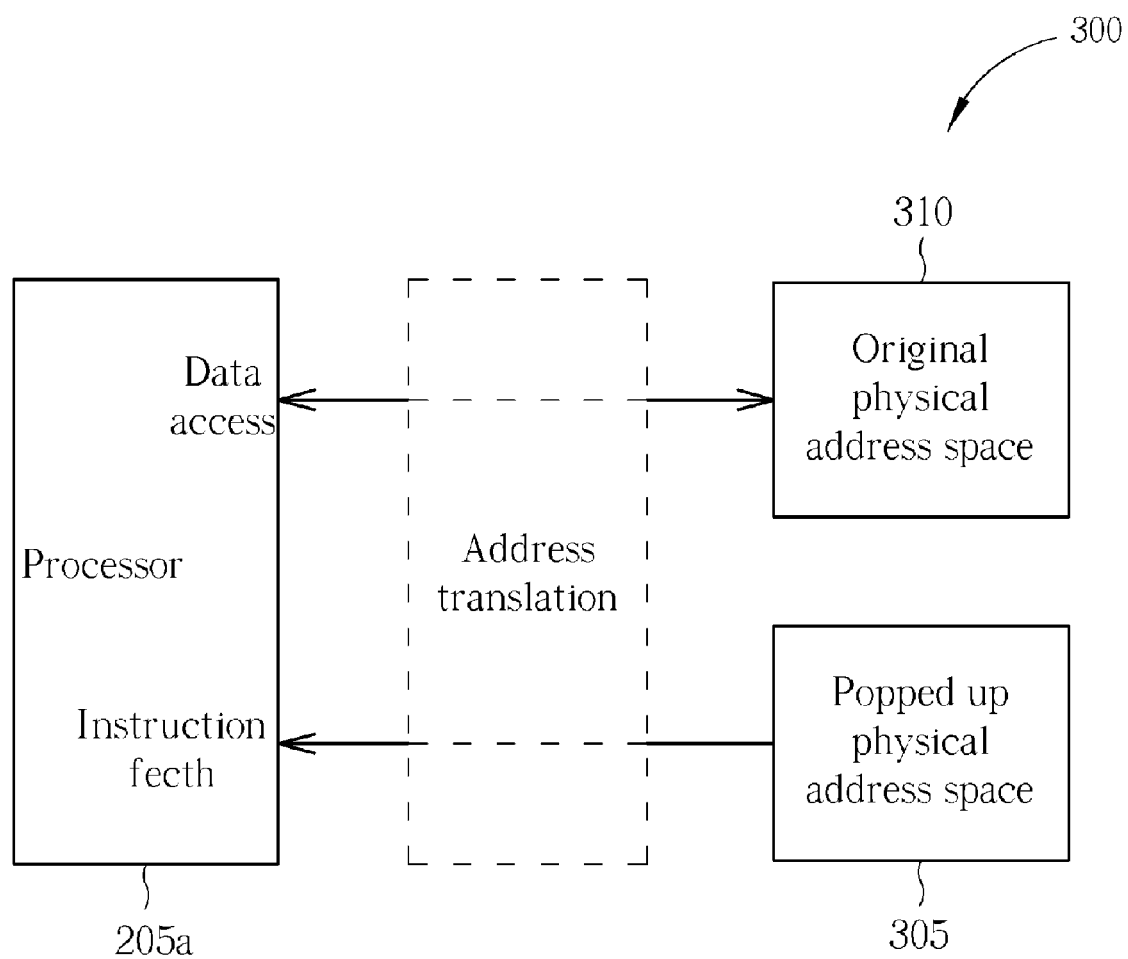
FIG. 3 is a diagram illustrating an implementation to map a DIM shown in FIG. 2B or FIG. 2C to a physical address space for supporting instruction fetching only.

In this invention, several design examples of the DIM 220a are provided. Please refer to FIG. 3. FIG. 3 is a diagram illustrating an implementation to map the DIM 220a shown in FIG. 2B/2C to a physical address space for supporting instruction fetching only. In this example, the DIM 220a is mapped to a physical address space 305 that is visible to the target processor 205a in debug mode, and this physical address space 305 is used for instruction fetching only to the target processor 205a. A data access space for debugging purposes is also the same as the original physical address space 310 in the processor view of the target system memory 215. It is necessary for a comprehensive debug scheme to provide a backup of states of the target processor 205a and a portion of the target system memory 215 to thereby run desired comprehensive debug functions, so the debug scheme may require memory space for data access. An advantage is that it is easy for hardware to implement the mapping of DIM 220a to physical address space 305, while leave to the debug software on the debug host 225 to translate between physical addresses and virtual addresses. Additionally, the timing to exit debug mode is when an instruction out of the space of the DIM 220a or a specific instruction is executed; this specific instruction is usually an IRET instruction, i.e. an interrupt return instruction that returns the control of a processor back to when it was interrupted for entering debug mode. In addition, in order to save the size of a physical storage, in implementation, only a relatively small size of space of the DIM 220a is required since a sliding window can be used to map to the entire popped up address space to the DIM 220a. Please note that in this example the designs of the DIMs 220b-220d are identical to that of the DIM 220a and are not illustrated for brevity.

Figure 4:
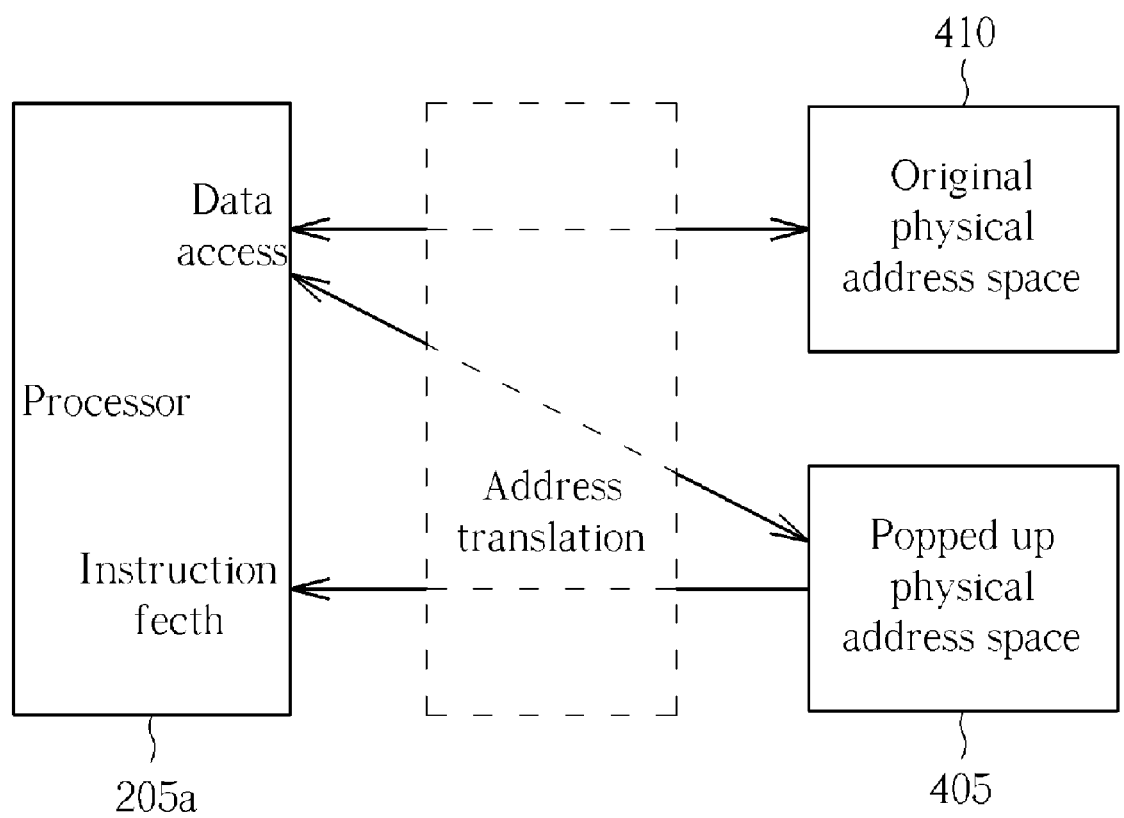
FIG. 4 is a diagram illustrating an implementation to map the DIM shown in FIG. 2B or FIG. 2C to a physical address space for supporting both instruction fetching and data access.

In another example, the address space of the DIM 220 is mapped to a physical address space for supporting both instruction fetching and data access. Please refer to FIG. 4. FIG. 4 is a diagram illustrating an implementation to map the DIM 220a shown in FIG. 2B/2C to a physical address space 405 for supporting both instruction fetching and data access to the target processor 205a. For a simple design, two separate base address registers are required. Additionally, in order to save the storage size of the DIM 220a, two DIM storages having separately smaller sizes are implemented in the form of sliding windows mapping to the entire space of the DIM 220a, and the DIM storages are respectively used for instruction fetching and data access. It is not required to provide a complete backup for information stored within an original physical address space 410 in the system memory 215; only a backup of internal states of the target system 200 is necessary. Therefore, the debug software implemented in the DIM 220a can be more comprehensive and have resources to store the state of the target system 200. For software, an address translation scheme needs to translate physical addresses to virtual addresses and virtual addresses to physical addresses. Please note that in this example the designs of the DIMs 220b-220d are identical to that of the DIM 220a and are not illustrated for brevity.

Figure 5:
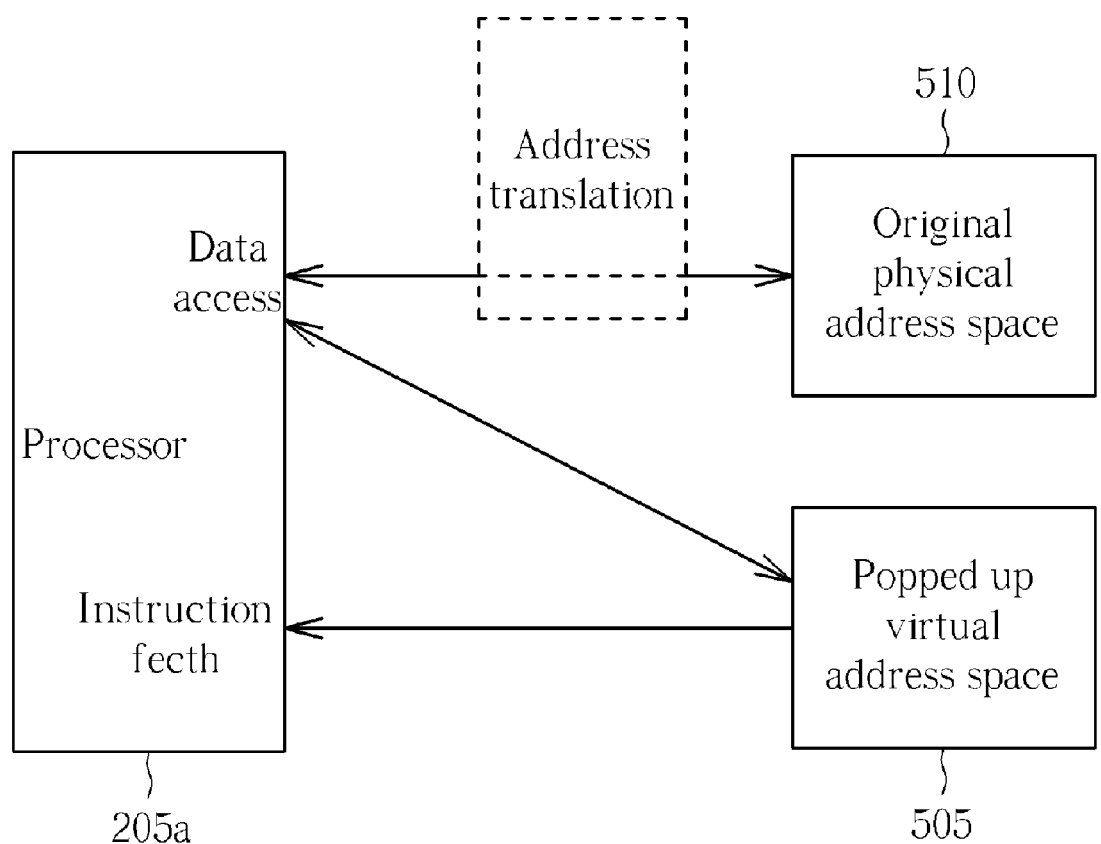
FIG. 5 is a diagram illustrating an implementation to map the DIM shown in FIG. 2B or FIG. 2C to a virtual address space for supporting both instruction fetching and data access.

In the above-mentioned examples, the address space of the DIM 220a is mapped to a physical address space, and it is convenient for a programmer to debug a program code running on a physical address space, e.g. kernel program code. For debugging a program code running on a virtual address space (e.g. user program code), in other examples, the address space of the DIM 220a is mapped to a user virtual space for both instructions and data, instead of the physical address space. Herein, the kernel program code is just used as an example to explain the debugging of a program code running on the physical address space; in some particular systems, user program codes might run on physical address space. In addition, the user program code is also used as an example to explain the debugging of a program code running on the virtual address space; in some comprehensive systems, kernel program codes may run on virtual address space. The kernel and user program codes are not meant to be limitations of the present invention. Please refer to FIG. 5. FIG. 5 is a diagram illustrating an implementation to map the DIM 220a shown in FIG. 2B/2C to a virtual address space 505 for supporting both instruction fetching and data access to the target processor 205a. The popped up virtual address space 505 is visible to the target processor 205a in debug mode. The debug software does not require performing further address translation since the address translation for the original physical address space 510 is performed by a hardware system; the original physical address space 510 stores a target application (e.g. the user/kernel program) to be debugged. Thus, the debug software can use the debug information accessible through the virtual address space or debug user space program code without additional address translation. Please note that in this example the designs of the DIMs 220b-220d are identical to that of the DIM 220a and are not illustrated for brevity.

Figure 6:
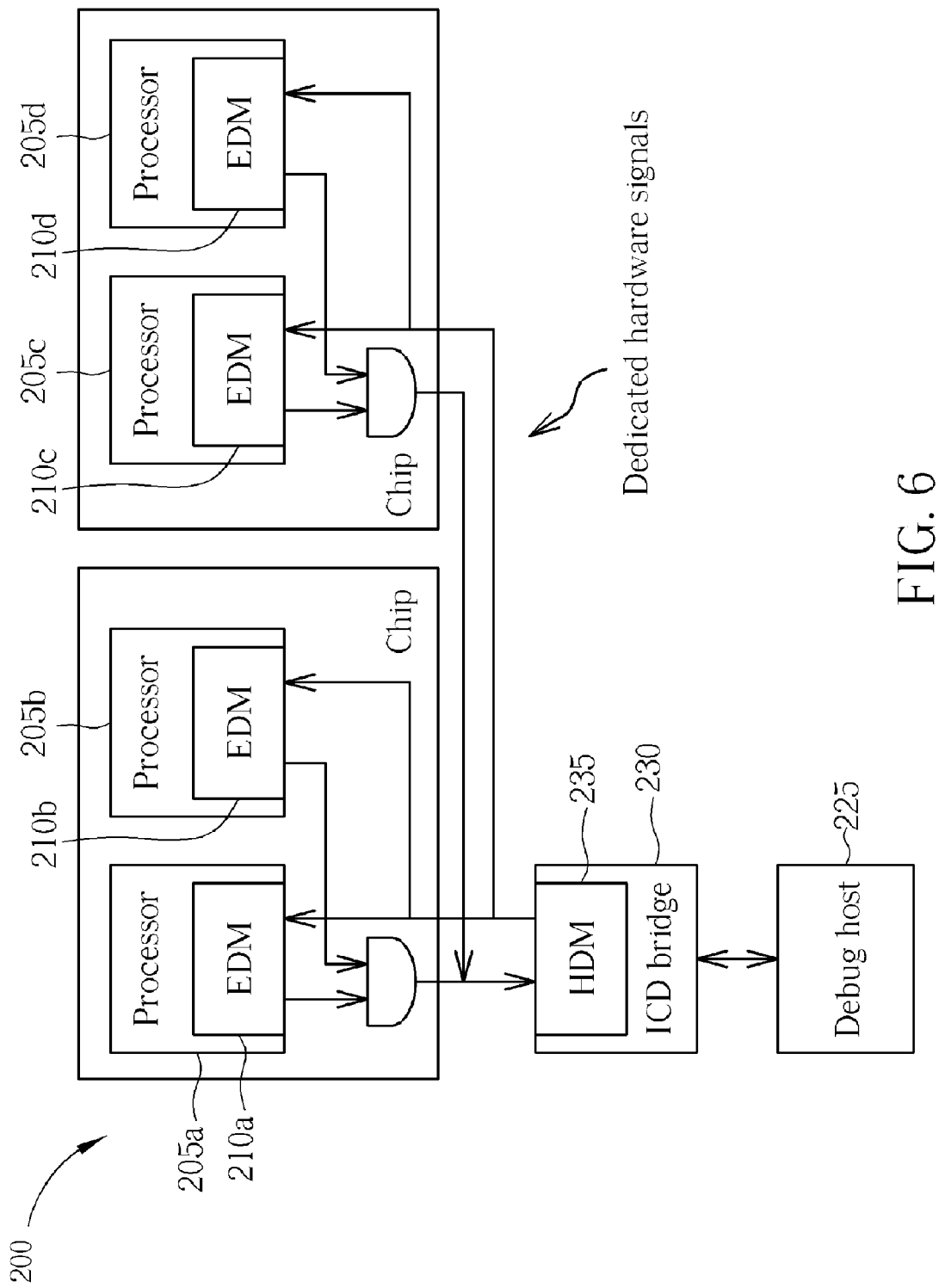
FIG. 6 is a diagram of an example showing the operation of a two-way debugging notification function via hardware signals.
Figure 7:
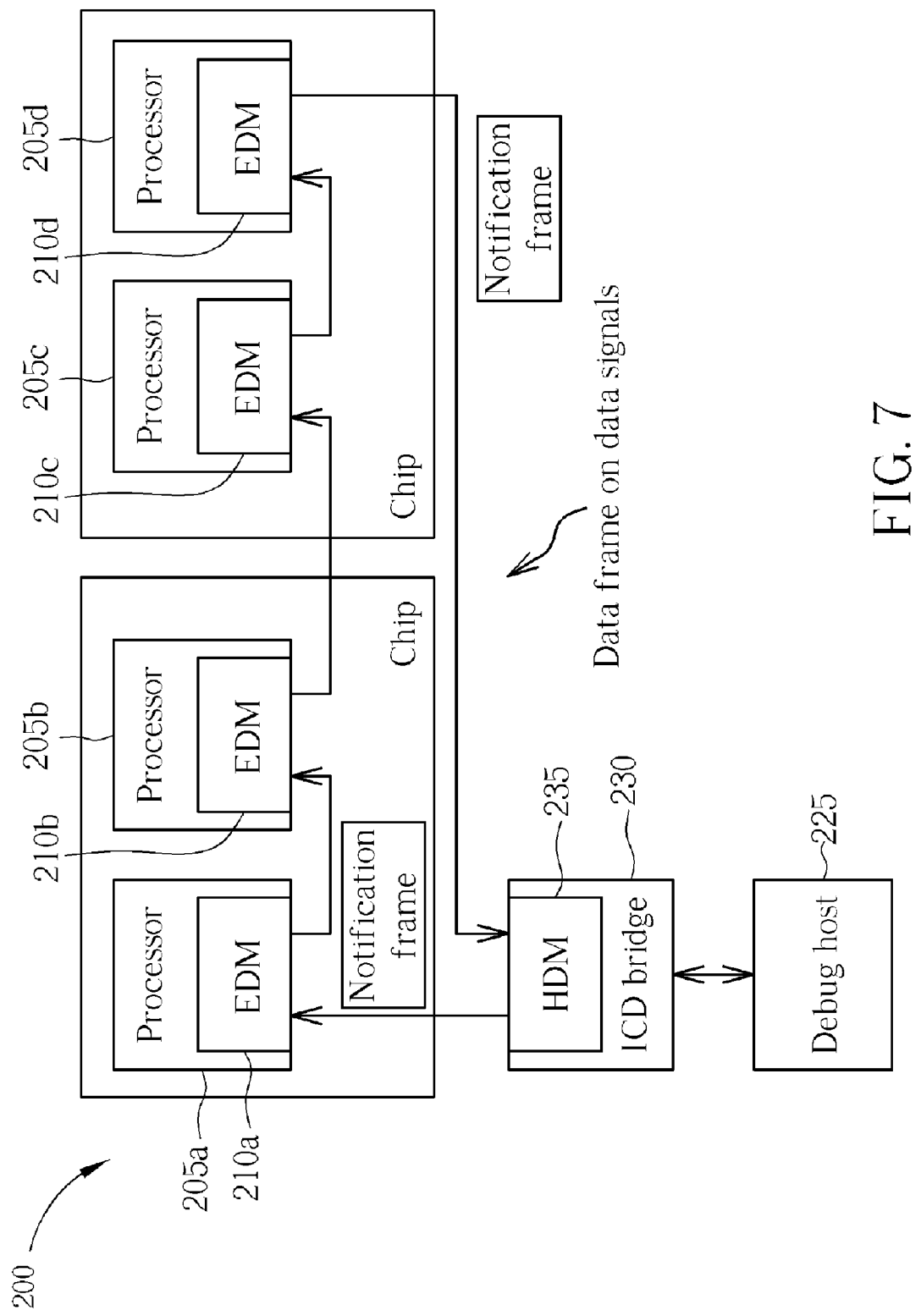
FIG. 7 is a diagram of an example showing the operation of the two-way debugging notification function via a data frame on data signals.

In addition, in this embodiment, the ICD system 200 supports a debug notification function. Since the ICD system 200 includes four target processors 205a-205d and these target processors form an ICD chain, it is required that the debug host 225 is informed by a debug notification if one of these target processors 205a-205d meets a particular triggering condition for entering debug mode or the debug host 225 initiates a debug notification to stop at least one of these processors when necessary. For example, a debug notification is sent from one of the target processors 205a, 205b, 205c, and 205d to the debug host 225 when this target processor is first trapped into debug mode by a debug exception due to an enablement of the ICD feature. A debug notification can be sent from a target processor, e.g. 205a, to the debug host 225 when the target processor 205a requests replenishment of debug instructions in debug mode or the target processor 205a is ready for data transfer between the target processor 205a itself and the debug host 225. In other words, a programmer can set various triggering conditions associated with entering debug mode into the target processors 205a, 205b, 205c, and 205d, respectively; when a target processor meets a particular triggering condition, this target processor sends a debug notification to inform the debug host 225. Of course, for the debug host 225, a debug notification can be transmitted by the debug host 225 to the target processor 205a on user demands when the debug host 225 is going to stop the operation of the target processor 205a and to trap the target processor 205a into debug mode. As mentioned above, the debug notification function is a two-way debug notification function. A debug notification in the two-way debug notification function can be transmitted by two different forms: dedicated hardware signals or data frame on data signals, as shown in FIG. 6 and FIG. 7. It should be noted that the ICD system 200 including four target processors 205a-205d is just used as an example for illustrative purposes; the number of target processors on an ICD chain should not be a limitation of the present invention. Further, the number of target processors included within a chip is not intended to be a limitation of the present invention.

Figure 8:
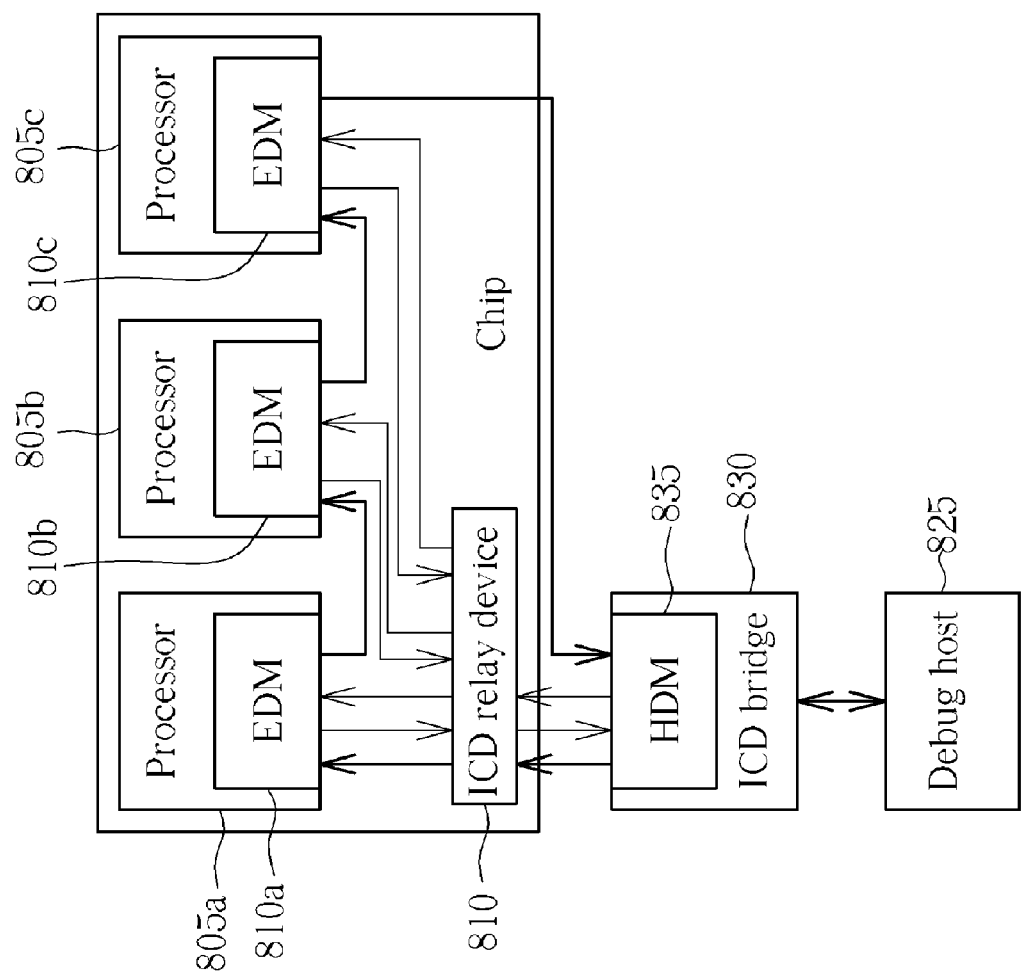
FIG. 8 is a diagram illustrating an example of the operation of the inter-processor debugging function.

The ICD system 200 also supports an inter-processor debugging function. The inter-processor debugging means that the debug software running on the debug host 225 is capable of trapping one processor into debug mode immediately when another processor has been trapped into debug mode. In implementation, the debug software simply converts a debug notification from one target processor to a converted debug notification for another target processor by an ICD relay device. Please refer to FIG. 8. FIG. 8 is a diagram illustrating an example of the operation of the inter-processor debugging function. In this example, an ICD chain comprises three target processors 805a, 805b, and 805c. When one of the target processors 805a, 805b, and 805c has been trapped into debug mode, a debug host will stop the other target processors and trap the other target processors into debug mode by the ICD relay device 810. The ICD relay device 810 is controlled by a debug host 825 via ICD connection, i.e. the ICD bridge 830. That is, the debug host 825 can issue commands to the ICD relay device 810 for requesting to stop at least one of the target processors 805a, 805b, and 805c. Then, the ICD relay device 810 drives signals corresponding to the commands to stop one or more target processors and informs the debug host 825 that a particular processor has been stopped if this processor is stopped. In other words, by the ICD relay device 810, the debug host 825 can selectively stop one or more processors without stopping all processors. Of course, a debug notification issued by a debug host can be broadcasted to all target processors to stop the entire target processors; this also obeys the spirit of the present invention. In addition, for the ICD system 200 shown in FIG. 2A, when the target processor 205a is trapped into debug mode, for example, the target processor 205a can transmit a debug notification to the other target processors 205b, 205c, and 205d to trap these target processors into debug mode.

Moreover, the ICD system 200 in this embodiment is capable of achieving the purposes of non-intrusive debugging. The non-intrusive debugging means to emphasize the truth of complete separation of information and storage used in debug mode process and those used in normal mode process. The debug software on the debug host 225 can set any triggering condition on any of the target processors 205a, 205b, 205c, and 205d, without changing states of the target processors 205a, 205b, 205c, and 205d. The states of the target system 200 associated with debug mode can be observed under the condition that the operation of the target system 200 is not interfered with. In implementation, debug registers within the target processors 205a, 205b, 205c, and 205d are designed to become read-only to the target processors 205a-205d respectively when these target processors are in debug mode. Accordingly, a runaway program cannot interfere with the debugging process controlled by debug registers in debug mode. Thus, a debugging process utilizing instructions or data from the DIM 220a that controls the target processor 205a requires no target system memory nor operation registers for storage, and hence the information and storage required in debug mode operation is completely separated from the information and storage used in normal mode without mutual interfering.

Furthermore, the ICD system 200 provides the ability of fast block data transfer. Since the operating clock required by the debug software running on the debug host 225 is different from that utilized by the target processors 205a, 205b, 205c, and 205d, the target processors 205a, 205b, 205c, and 205d are not always ready to receive an amount of data, which is downloaded from the debug host 225. Thus, a retransmission scheme is required. In this embodiment, the debug host 225 initiates the fast block data transfer between the HDM 235 of the ICD bridge 230 and the EDMs 210a, 210b, 210c, and 210d, for transmitting information (including an amount of data) to the target system memory 215 affixed to the target processors 205a, 205b, 205c, and 205d; the information further includes a specific suffix bit pattern used for determining whether the information transmitted by the debug host 225 is successfully received by a desired processor when the HDM 235 communicates to one of EDMs 210a-210d through a communication channel such as JTAG chain. Because of the characteristic of JTAG interface, the specific suffix bit pattern is transmitted via the ICD chain comprised by the EDMs 210a, 210b, 210c, and 210d. When the information is successfully received by an EDM of the desired processor, e.g. the EDM 210a of the target processor 205a, the EDM 210a changes content of the specific suffix bit pattern and returns the specific suffix bit pattern to the HDM 235. Then, by checking the specific suffix bit pattern, the HDM 235 can know that the information has been successfully received by the desired processor. This can reduce the roundtrip time of a retransmission. It should be noted that the information transmitted by the debug host 225 is a block of data used for updating at least a portion of the target system memory 215.

Additionally, the amount of data, which is downloaded from the debug host 225, is often used for fixing bugs in the program code; it may even be required to download a new program code to replace the old one in a worst case. In this situation, it is not efficient to download the very large data amount of the new program code from a debug host to a desired processor in a conventional way. The ICD system 200 provides an efficient scheme to transfer a large amount of data. Particularly, the debug host 225 transmits a block data each time, wherein the block data corresponds to a consecutive address space and includes multiple instructions, so the debug host 225 does not need to notify the desired processor that data associated with a particular instruction should be accessed according to a particular address every time. The debug host 225 only requires informing the desired processor of a programmable base address to specify the beginning of the block data. In implementation, an auto address counter is utilized for eliminating overheads due to data transfer on JTAG interface. In another example, the debug host 225 sends a command to the ICD bridge 230 to initiate fast data transfer from a memory, and then the ICD bridge 230 manages to pull a block data from this memory to the debug host 225. This also falls within the scope of the present invention.

Those skilled in the art will readily observe that numerous modifications and alterations of the device and method may be made while retaining the teachings of the invention.

What is claimed is:

1. An in-circuit debugging (ICD) system, comprising:
   at least a first target processor having an embedded debug module (EDM), where the first target processor performs a program code in a normal mode and the first EDM controls the first target processor in a debug mode;
   a debug information memory (DIM), for storing debug information for debugging in the debug mode, wherein the DIM is invisible to the first target processor when the first target processor operates in the normal mode;
   a debug host having a debug software, for debugging the program code by using the debug information in the debug mode; and
   an in-circuit debugging bridge (ICD bridge) having a host debug module (HDM) coupled to the first EDM, the ICD bridge being coupled between the first target processor and the debug host and utilized for bridging information communicated between the first target processor and the debug host.

2. The ICD system of claim 1, further comprising:
   a target system memory affixed to the first target processor, for storing the program code in the normal mode, wherein a portion of a processor address space in the debug mode is allocated to the DIM, and the portion of the processor address space is remapped back to the target system memory when the debug mode exits.

3. The ICD system of claim 1, wherein the DIM is mapped to a physical address space visible to the first target processor, and the DIM is only used for instruction fetching.

4. The ICD system of claim 1, wherein the DIM is mapped to a physical address space visible to the first target processor, and the DIM is used for instruction fetching and data access.

5. The ICD system of claim 1, wherein the DIM is mapped to a virtual address space visible to the first target processor, and the debug software directly uses information accessible through the virtual address space or debug user space program code without additional translation.

6. The ICD system of claim 1, further comprising:
   one or more second target processors, each having a second EDM, coupled to the first target processor and the HDM through an ICD chain, for performing a code segment of the program code in the normal mode, the second EDM of each second target processor being utilized for controlling the second target processor in the debug mode;
   wherein the first and second target processors form an ICD chain; and when the first target processor is trapped into the debug mode, the first target processor transmits a notification to one or more of the second target processors to trap the second target processors into the debug mode.

7. The ICD system of claim 6, wherein the debug host transmits the notification to the first target processor to trap the first target processor into the debug mode.

8. The ICD system of claim 6, wherein the first target processor transmits the notification to the debug host when entering the debug mode, requesting a debug instruction in the debug mode, or being utilized for data transfer between the first target processor and the debug host.

9. The ICD system of claim 1, wherein the debug host initiates a data transfer between the HDM of the ICD bridge and the EDM of the first target processor for transmitting information to a target system memory affixed to the first target processor, and the information includes a specific suffix bit pattern used for determining whether the information transmitted by the debug host is received by the first target processor.

10. The ICD system of claim 9, wherein the EDM of the first target processor changes content of the specific suffix bit pattern and then returns the specific suffix bit pattern to the HDM when the information transmitted by the debug host is successfully received by the first target processor.

11. The ICD system of claim 9, wherein the information transmitted by the debug host is a block of data used for updating at least a portion of the target system memory.

12. The ICD system of claim 1, wherein the first target processor further comprises at least one debug register, and the debug register is read-only to the first target processor in debug mode.

13. An in-circuit debugging (ICD) method, comprising:
providing at least a first target processor having an embedded debug module (EDM) and an address translation function that translates between physical address and virtual address, where the first target processor performs a program code in a normal mode, and using the first EDM to control the first target processor in a debug mode;
providing a debug information memory (DIM) to store debug information for debugging in the debug mode, wherein the DIM is invisible to the first target processor when the first target processor operates in the normal mode;
utilizing a debug software of a debug host to debug the program code by using the debug information in the debug mode; and
bridging information communicated between the first target processor and the debug host.

14. The ICD method of claim 13, further comprising:
providing a target system memory for storing the program code in the normal mode, wherein a portion of a processor address space in the debug mode is allocated to the DIM, and the portion of the processor address space is remapped back to the target system memory when the debug mode exits.

15. The ICD method of claim 13, further comprising:
mapping the DIM to a physical address space visible to the first target processor, wherein the DIM is only used for instruction fetching.

16. The ICD method of claim 13, further comprising:
mapping the DIM to a physical address space visible to the first target processor, wherein the DIM is used for instruction fetching and data access.

17. The ICD method of claim 13, further comprising:
mapping the DIM to a virtual address space visible to the first target processor; and
directly using information accessible though the virtual address space or debug user space program code without additional translation.

18. The ICD method of claim 13, further comprising:
providing one or more second target processors each having a second EDM, wherein each second target processor performs a code segment of the program code in the normal mode, the second EDM of each second target processor controls the second target processor in the debug mode, and the first and second target processors are coupled through an ICD chain; and
using the first target processor to transmit a notification to one or more of the second target processors to trap the second target processors into the debug mode when the first target processor is trapped into the debug mode.

19. The ICD method of claim 18, further comprising:
utilizing the debug host to transmit the notification to the first target processor to trap the first target processor into the debug mode.

20. The ICD method of claim 18, further comprising:
utilizing the first target processor to transmit the notification to the debug host when entering the debug mode, requesting a debug instruction in the debug mode, or being utilized for data transfer between the first target processor and the debug host.

21. The ICD method of claim 13, further comprising:
initiating a data transfer between an HDM of an ICD bridge and the EDM of the first target processor for transmitting information to a target system memory affixed to the first target processor where the information includes a specific suffix bit pattern used for determining whether the information transmitted by the debug host is received by the first target processor.

22. The ICD method of claim 21, further comprising:
changing content of the specific suffix bit pattern and then returning the specific suffix bit pattern to the HDM when the information transmitted by the debug host is successfully received by the first target processor.

23. The ICD method of claim 21, wherein the information transmitted by the debug host is a block of data used for updating at least a portion of the target system memory.

24. The ICD method of claim 13, wherein the first target processor further includes at least one debug register and the debug register is read-only to the first target processor in the debug mode.

* * * * *